J. PROKSA.
FLYING MACHINE.
APPLICATION FILED MAR. 9, 1911.
1,007,486.
Patented Oct. 31, 1911.
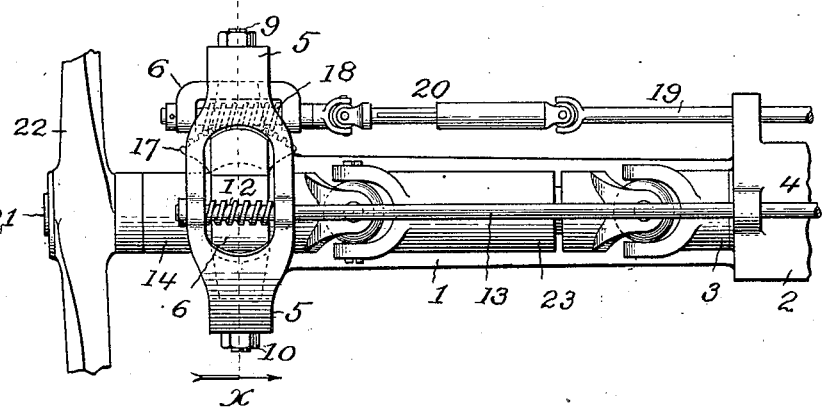
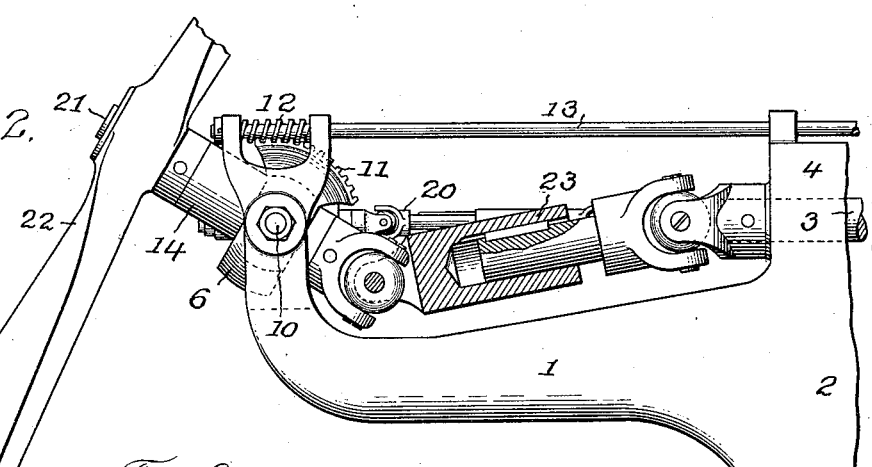
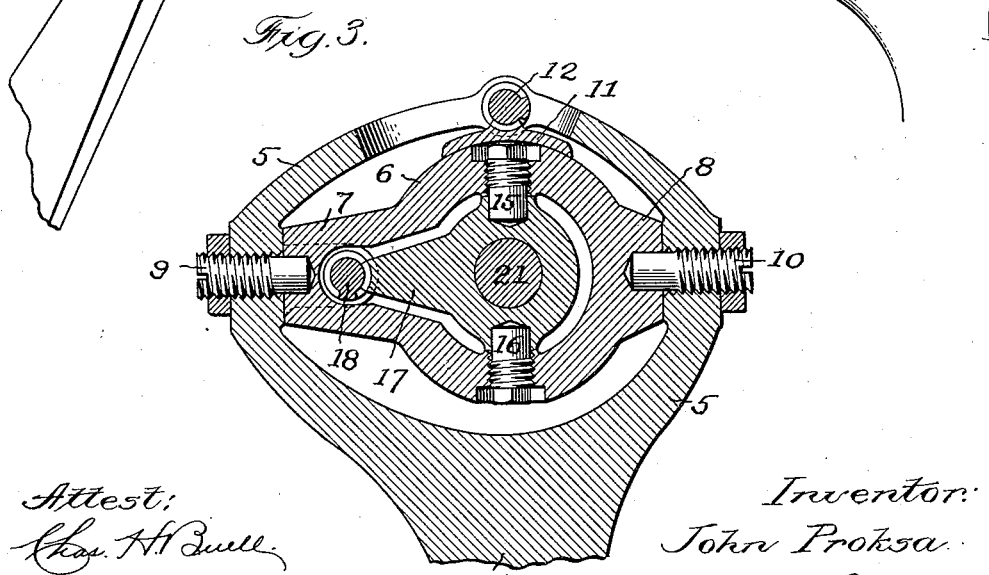
Attest:
Chas. H. Buell
Henry Moe
Inventor:
John Proksa
by Robert Burns
Atty.

UNITED STATES PATENT OFFICE.

JOHN PROKSA, OF CHICAGO, ILLINOIS.

FLYING-MACHINE.

1,007,486.

Specification of Letters Patent. Patented Oct. 31, 1911.

Application filed March 9, 1911. Serial No. 613,413.

*To all whom it may concern:*

Be it known that I, JOHN PROKSA, a citizen of the United States of America, and a resident of Chicago, in the county of Cook, State of Illinois, have invented certain new and useful Improvements in Flying-Machines, of which the following is a specification.

This invention relates to a combined driving and steering propeller for flying machines, and has for its object to provide a simple and efficient structural arrangement and combination of parts adapted to afford an easy, certain and effective adjustment of the propeller carrying shaft to any desired angular relation to the longitudinally extending motor shaft of the machine, all as will hereinafter more fully appear.

In the accompanying drawings:—Figure 1, is a fragmentary plan view of a mechanism embodying the present invention. Fig. 2, is a side elevation of the same with parts in section. Fig. 3, is an enlarged detail transverse section on line $x$, Fig. 1.

Similar numerals of reference indicate like parts in the several views.

Referring to the drawings, 1 represents the stationary supporting frame of the present mechanism, preferably formed as a rearward extension of the frame or housing of the engine used in propelling the flying machine.

3 is the rear portion of the engine shaft, and 4 the rear bearing for the same, said frame being preferably formed as a part of the engine housing, as usual.

5 is a vertically arranged transverse yoke at the rear end of the frame 1. Said yoke is adapted to receive and provide horizontal pivotal support for the hereinafter described universally adjustable carrier of the propeller shaft and its propeller.

6 is the outer gimbal member of the present construction. Said member is of an approximately ring shape, arranged vertically and formed with horizontal end hubs 7 and 8 for the reception of pivot gudgeons or bolts 9 and 10, by which said member is pivotally attached to the aforesaid yoke 5 of the supporting frame 1. In addition the gimbal member 6 is formed with vertical screw-threaded orifices for the reception of the pivot gudgeons or screw bolts by which pivotal connection is made between said outer gimbal member 6 and the inner gimbal member or carrier hereinafter described.

11 is a worm sector secured to the gimbal member 6 in concentric relation to the pivotal axis of the same, and 12 is a worm shaft journaled in bearings formed therefor in the above described yoke 5 and having operative engagement with the worm sector 11 aforesaid. Said worm shaft is provided with an extension stem or rod 13 extending within convenient reach of the operator for effecting angular adjustment of the propeller in a vertical plane.

14 is the inner gimbal member above referred to, and which is pivotally supported in the opening of the outer gimbal member 6 by vertically arranged pivot gudgeons or screw-bolts 15 and 16 above referred to. The inner gimbal member is of a tubular box form to provide a bearing for the propeller shaft hereinafter described and carries a horizontally arranged worm sector 17 at one side, adapted for operative engagement with a worm shaft 18 journaled in bearing boxes carried by the outer gimbal member 6 as shown.

19 is an operating rod or stem extending from a point adjacent to the operator and connected by an extensible universal joint 20, of any ordinary and usual construction, with the aforesaid worm shaft 18, to enable the operator to impart angular adjustment in a vertical plane to the propeller.

21 is the propeller shaft above referred to and which is journaled in the tubular box portion of the inner gimbal member 14 above described. At its rear end said shaft 21 carries the propeller 22, and at its forward end is connected to the rear end of the engine shaft 3, by an extensible universal joint 23 of any ordinary and usual construction.

Having thus fully described my said invention what I claim as new and desire to secure by Letters Patent, is:—

1. In a driving and steering mechanism for flying machines, the combination of an engine shaft, a propeller shaft, an extensible universal joint, forming an operative connection between the two shafts, an inner gimbal member carrying the propeller shaft, an outer gimbal member carrying said inner gimbal member, vertical pivot gudgeons connecting the gimbal members together, a supporting frame formed with a yoke, horizontal pivot gudgeons connecting said yoke and the outer gimbal member together, individual means for imparting angular adjustment to the outer gimbal member in one plane, and individual means for imparting angular adjustment to the inner gimbal member in another plane, substantially as set forth.

2. In a driving and steering mechanism for flying machines, the combination of an engine shaft, a propeller shaft, an extensible universal joint, forming an operative connection between the two shafts, an inner gimbal member carrying the propeller shaft, an outer gimbal member carrying said inner gimbal member, vertical pivot gudgeons connecting the gimbal members together, a supporting frame formed with a yoke, horizontal pivot gudgeons connecting said yoke and the outer gimbal member together, individual means for imparting angular adjustment to the outer gimbal member, comprising a worm sector, on said member, a worm carried by the supporting frame and engaging said worm sector and an operating rod connected to said worm, and individual means for imparting angular adjustment to the inner gimbal member, comprising a worm sector on said member, a worm carried by the outer gimbal member and engaging said worm sector, an operating rod and an extensible universal joint connecting said operating rod to the worm of the inner gimbal member, substantially as set forth.

Signed at Chicago, Illinois, this 4th day of March 1911.

JOHN PROKSA.

Witnesses:
ROBERT BURNS,
HENRY UTOE.

Copies of this patent may be obtained for five cents each, by addressing the "Commissioner of Patents, Washington, D. C."